United States Patent
Gudapati (12) United States Patent (10) Patent No.: US 11,976,721 B2
(45) Date of Patent: May 7, 2024

(54) METHOD FOR EFFICIENTLY MANAGING IGNITION STATES FOR KEYLESS IGNITION SYSTEMS FOR VEHICLES WITH ELECTRONIC SHIFTER AND ELECTRONIC SECUREMENT SYSTEMS

(71) Applicant: Abhilash Gudapati, Troy, MI (US)

(72) Inventor: Abhilash Gudapati, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 63 days.

(21) Appl. No.: 17/825,538

(22) Filed: May 26, 2022

(65) Prior Publication Data

US 2023/0383836 A1     Nov. 30, 2023

(51) Int. Cl.
| | |
|---|---|
| *F16H 59/54* | (2006.01) |
| *F16H 59/08* | (2006.01) |
| *F16H 63/42* | (2006.01) |
| *F16H 63/48* | (2006.01) |
| *F16H 59/02* | (2006.01) |
| *F16H 59/74* | (2006.01) |

(52) U.S. Cl.
CPC .............. *F16H 59/54* (2013.01); *F16H 59/08* (2013.01); *F16H 63/42* (2013.01); *F16H 63/483* (2013.01); *F16H 59/0204* (2013.01); *F16H 2059/746* (2013.01)

(58) Field of Classification Search
CPC ...... F16H 59/54; F16H 59/08; F16H 59/0204; F16H 2059/746; F16H 61/22; F16H 2061/223; F16H 2061/226; F16H 63/42; F16H 63/48; F16H 63/486; F16H 2063/423; F16H 2063/426; B60W 2510/188
See application file for complete search history.

(56) References Cited

U.S. PATENT DOCUMENTS

| | | | |
|---|---|---|---|
| 7,963,882 B2 | 6/2011 | Nishimura | |
| 9,014,895 B2 | 4/2015 | Suzuki et al. | |
| 9,322,378 B2 | 4/2016 | Lovett et al. | |
| 10,371,112 B1 | 8/2019 | Khafagy et al. | |
| 10,724,490 B2 | 7/2020 | Chen et al. | |
| 2011/0068895 A1 | 3/2011 | Gee et al. | |
| 2013/0072350 A1* | 3/2013 | Ueno | F16H 59/54 |
| | | | 477/111 |
| 2014/0129102 A1* | 5/2014 | Wagoner | F16H 61/12 |
| | | | 701/64 |
| 2015/0020634 A1 | 1/2015 | TenBrink et al. | |
| 2018/0148057 A1* | 5/2018 | Khafagy | B60W 30/18054 |

* cited by examiner

*Primary Examiner* — Lori Wu
(74) *Attorney, Agent, or Firm* — Jeremy J. Klobucar (57) ABSTRACT

A control system and method for a vehicle is provided. The system comprises a poly-shifter, an RF Hub, a transmission control module (TCM) and a controller. The poly-shifter is configured to be moved between operating states including "Park" and "Non-Park" positions. The RF Hub supports operational features of the vehicle. The TCM determines a lock state of a parking pawl in a transmission of the vehicle and communicates the lock state to the RF Hub. The controller is configured to determine whether a driver has exited the vehicle with the poly-shifter in a "Non-Park" position. The controller is further configured to power down the vehicle based on the lock state of the parking pawl being in a "Park" position and the driver exiting the vehicle with the poly-shifter in the "Non-Park" position.

19 Claims, 7 Drawing Sheets

Fig. 1

| Scenarios | Event 1 | Event 2 | Event 3 | Event 4 | Event 5 | Event 6 | Event 7 | Event 8 Ignition state | Event 9 Failure |
|---|---|---|---|---|---|---|---|---|---|
| Scenario 1: Auto-Shift to Park during a Engine Auto-Stop Event and Driver exits the vehicle without Keying Off the Vehicle (100A) | 110A: Engine Auto Stopped, with Shifter in Drive | 112A: Brake Released → Ready to Auto Start | 114A: Door Opened | 116A: Engine start aborted → ESS Securement Enabled Park Supervisory Controller Engages Park Pawl | 118A: ESS HMI message: "Shift to Park to Exit, Shift to Drive to Restart" | 120A: Shifter remains at D | 122A: Driver Exits vehicle | 124A: Vehicle does not Switch OFF-Ignition Stays in Run with Engine OFF | 130A: 12 V Drains |
| Scenario 2: Auto-Shift to Park during with a Driver Key OFF and exiting the vehicle without moving the shifter to Park (100B) | 110B: Vehicle Comes to a stop with Shifter in R/N/D | 112B: Driver Presses the Key in Ignition button | 114B: Ignition status ACC | 116B: Park Supervisory Controller Defaults to Park | 118B: HMI message: "Shift to Park to Start" | 120B: Shifter remains at R/N/D | 122B: Driver Exits vehicle | 124B: Vehicle does not Switch OFF-Ignition Stays in ACC with Engine OFF | 130B: Drains 12V Battery and also High Voltage Batteries on the Electrified Vehicle |
| Scenario 3: Gated Park Switch Faulted with Driver moving the shifter to Park and the Transmission in Park (100C) | 110C: Shifter is in Park | 112C: Park Supervisory Controller Engages Park Pawl | 114C: TCM/HCP has Short to battery or Open circuit fault on Gated Park Switch | 116C: Driver Presses Key in Ignition to Switch OFF | 118C: MIL will be ON With HMI message: MIL = "Service Transmission" | 120C: Shifter remains at P | 122C: Driver Exits vehicle | 124C: Vehicle does not Switch OFF-Ignition Stays in ACC with Engine OFF | 130C: Drains 12V Battery and also High Voltage Batteries on the Electrified Vehicle |

Fig. 3  Prior Art

| Scenarios | Event 1 | Event 2 | Event 3 | Event 4 | Event 5 | Event 6 | Event 7 |
|---|---|---|---|---|---|---|---|
| Scenario 1: Auto-Shift to Park during a Engine Auto-Stop Event and Driver exits the vehicle without Keying Off the Vehicle | 210A Engine Auto Stopped, with Shifter in Drive | 212A Brake Released → Ready to Auto Start | 214A Door Opened | 216A Engine start aborted → ESS Securement Enabled → TCM/HCP Engages Park Pawl | 218A ESS HMI message: "Shift to Park to Exit, Shift to Drive to Restart" | 220A Shifter remains at D | 222A Driver Exits vehicle |
| Scenario 2: Auto-Shift to Park during with a Driver Key OFF and exiting the vehicle without moving the shifter to Park | 210B Vehicle Comes to a stop with Shifter in R/N/D | 212B Driver Presses the Key in Ignition button | 214B Ignition status ACC | 216B Park Supervisory Controller Defaults to Park | 218B HMI message: "Shift to Park to Start" | 220B Shifter remains at R/N/D | 222B Driver Exits vehicle |
| Scenario 3: Gated Park Switch Faulted with Driver moving the shifter to Park and the Transmission in Park | 210C Shifter is in Park | 212C Park Supervisory Controller Engages Park Pawl | 214C Park Supervisory Controller has Short to battery or Open circuit fault on Gated Park Switch | 216C Driver Presses Key in Ignition to Switch OFF | 218C MIL will be ON With HMI message MIL = "Service Transmission" | 220C Shifter remains at P | 222C Driver Exits vehicle |

| Event 8 New Logic | Event 9 Ignition State | Event 10 Ignition State |
|---|---|---|
| 240A → RF Hub looks at CAN Signal verifying Park =P And continue to Power down | 242A → Vehicle Shuts Down as per predetermined timing - Ignition OFF | 250A → 1) HMI will display "Press Brake and Push Button to Start" when Driver enters the vehicle. 2) R/D Blinking on the shifter 3) TCM/HCP will display HMI message "Shift to park to start" 4) Driver moves shifter to Park and cranks the vehicle, shifts out |
| 240B → RF Hub looks at CAN Trns_Spd.Gr =P And continue to Power down | 242B → Vehicle Shuts Down as per predetermined timing - Ignition OFF | 250B → 1) HMI will display "Press Brake and Push Button to Start" when Driver enters the vehicle. 2) R/D Blinking 3) TCM/HCP will display HMI message "Shift to park to start" 4) Driver moves shifter to Park and cranks the vehicle, shifts out |
| 240C → RF Hub looks at CAN Trns_Spd.Gr =P And continue to Power down | 242C → Vehicle Shuts Down as per predetermined timing - Ignition OFF | 250C → Normal Vehicle Crank and Drive Away with HMI message: "Service Transmission" |

METHOD FOR EFFICIENTLY MANAGING IGNITION STATES FOR KEYLESS IGNITION SYSTEMS FOR VEHICLES WITH ELECTRONIC SHIFTER AND ELECTRONIC SECUREMENT SYSTEMS

FIELD

The present application relates generally to vehicles having poly-stable shifters and more particularly to a method for powering down a vehicle when the poly-stable shifter is not positively located in the Park position.

BACKGROUND

More and more vehicles are being equipped with electronic shifters ("e-shifters") to place the vehicle's automatic transmission into a desired gear state. Electronic shifters can replace the traditional console mounted P-R-N-D-L mechanical shift lever and are typically implemented as levers, which can be pushed up/down or sideways, and/or buttons to effect gear changes. One typical lever type electronic shifter returns to its original or home position after it has been manipulated by the driver. As such, there is typically an indication adjacent to the electronic shifter lever providing a gear position indicator to visually show the driver what gear the vehicle is in.

A more recent development is to have a multi-position stable or poly-stable e-shifter that retains an actuator setting that represents a driver requested transmission gear state. With the poly-stable e-shifter, the shift lever can retain a manipulated position of the shift lever and, as such, is preferred by many drivers. For example, when a center console mounted poly-stable e-shifter lever is manipulated to a position to place the transmission into a drive gear, the shift lever can maintain that position in-line with an indication of "Drive" or "D" on a center console surface.

In some examples however, poly-stable shifters do not have an auto position correction to Park when the driver inadvertently fails to place the vehicle into Park. In such a scenario, the vehicle may not successfully power down causing the vehicle battery or batteries to drain. Accordingly, there remains a need for improvement in the relevant art.

SUMMARY

According to an example aspect of the invention, a control system for a vehicle is provided. In one exemplary implementation, the system comprises a poly-shifter, an RF Hub, a transmission control module (TCM) and a controller. The poly-shifter is configured to be moved between operating states including "Park" and "Non-Park" positions. The RF Hub supports operational features of the vehicle. The TCM determines a lock state of a parking pawl in a transmission of the vehicle and communicates the lock state to the RF Hub. The controller is configured to determine whether a driver has exited the vehicle with the poly-shifter in a "Non-Park" position. The controller is further configured to power down the vehicle based on the lock state of the parking pawl being in a "Park" position and the driver exiting the vehicle with the poly-shifter in the "Non-Park" position.

In some implementations, the controller is further configured to determine that the vehicle is in an engine auto-stop event and wherein the power down is further based on the vehicle in the engine auto-stop event. The controller is further configured to determine that the vehicle has not been keyed "OFF" and wherein the power down is further based on the vehicle not being keyed "OFF". Determining the vehicle has not been keyed "OFF" includes determining that an ignition status is "ON".

In some implementations, the controller determines that the driver has exited the vehicle based on a signal received by the controller indicative of at least one of a brake pedal being released, a vehicle door being opened and a seat belt being removed. In other implementations, subsequent to power down, the controller determines that a driver has entered the vehicle. The controller sends a signal to a human machine interface (HMI) to communicate a message informing the driver that the poly-shifter was not properly returned to "Park".

In other implementations, the controller determines an ignition state to be in "ACC" and wherein the controller communicates a signal to change the lock state of the parking pawl to the "Park" position based on the poly-shifter being in a "Non-Park" position and the ignition being in the ACC state.

According to another example aspect of the invention, a method for powering off a vehicle having a poly-shifter configured to be moved between operating states including "Park" and "Non-Park" positions is provided. In one exemplary implementation, the method comprises: determining a lock state of a parking pawl in a transmission of the vehicle; communicating the lock state to an RF Hub; determining whether a driver has exited the vehicle with the poly-shifter in a "Non-Park" position; and powering down the vehicle based on the lock state of the parking pawl being in a "Park" position and the driver exiting the vehicle with the poly-shifter in the "Non-Park" position.

According to some implementations, the method further comprises determining that the vehicle is in an engine auto-stop event and wherein the powering down is further based on the vehicle in the engine auto-stop event. In some implementations, determining that a driver has exited the vehicle is based on at least one of a brake pedal being released, a vehicle door being opened and a seat belt being removed. According to some implementations the method further comprises, subsequent to the powering down, determining whether a driver has entered the vehicle; and communicating a signal to a human machine interface (HMI) indicative of a message informing the driver that the poly-shifter was not properly returned to "Park".

According to other implementations, the method further comprises communicating a signal to change the lock state of the parking pawl to the "Park" position based on the determination that a driver has exited the vehicle with the poly-shifter in a "Non-Park" position. In some implementations, the method includes determining an ignition state to be in "ACC"; and communicating a signal to change the lock state of the parking pawl to the "Park" position based on the poly-shifter being in a "Non-Park" position and the ignition being in the "ACC" state.

According to another example aspect of the invention, a method for powering off a vehicle having a poly-shifter configured to be moved between operating states including "Park" and "Non-Park" positions is provided. In one exemplary implementation, the method comprises: determining a lock state of a parking pawl in a transmission of the vehicle; communicating the lock state to an RF Hub; determining whether a driver has exited the vehicle with the poly-shifter in a "Park" position; determining a circuit fault based on one of the poly-shifter and the lock state of the parking pawl; and powering down the vehicle based on the lock state of the parking pawl being in a "Park" position and the driver exiting the vehicle with the poly-shifter in the "Park" position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 3 is a table showing exemplary sequences of events related to various scenarios causing battery draining according to prior art;

DETAILED DESCRIPTION

In conventional systems, shutting down electrical power in a vehicle having a poly-shifter requires the state of the poly-shifter and a transmission to match. For example, if the transmission is in "Park" and the poly-shifter is not in "Park", the vehicle will drain the battery due to the fact that the vehicle components have full functionality which consumes vehicle power. There are various scenarios that may occur where a driver exits or leaves the vehicle thinking the vehicle is "Off", but with the ignition remaining in a "RUN" state, causing the battery to drain without the driver's immediate knowledge. Described herein are systems and methods for shutting down a vehicle to prevent inadvertent draining of a vehicle battery. As used herein "shutting down" or "powering off" is used to mean disconnecting the battery from providing operating current to vehicle components. The present systems and methods disclose an automated solution to shut down the vehicle even with the driver forgetting to physically move the poly-shifter to "Park".

Figure 1:
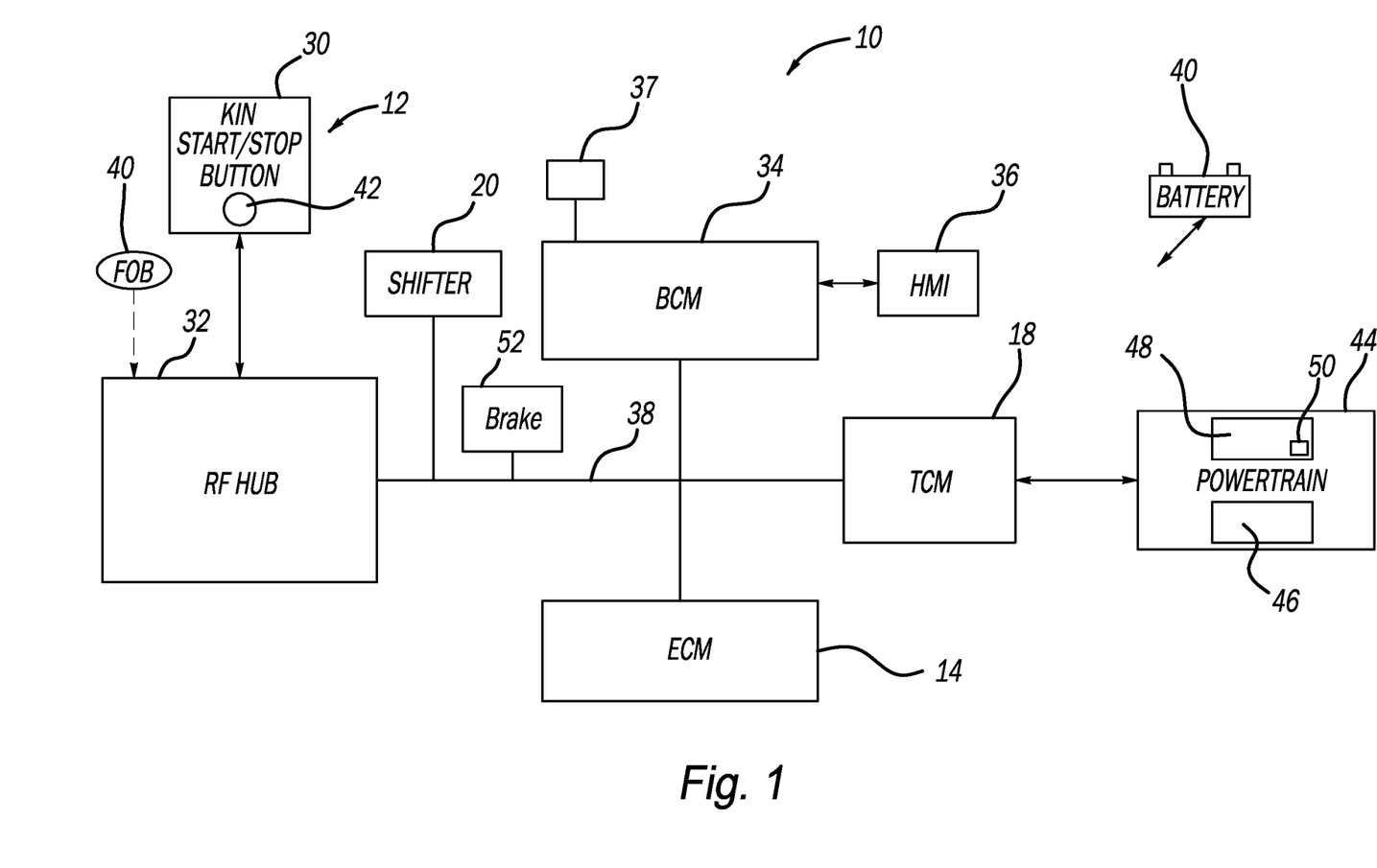
FIG. 1 is a schematic diagram of an example vehicle control system in accordance with the principles of the present disclosure.

With initial reference to FIG. 1, an example schematic diagram of a vehicle control system is illustrated and generally identified at reference numeral 10. The vehicle control system 10 is equipped with an automatic stop-start system configured to automatically shut down and restart a vehicle engine 46. In the example embodiment, the vehicle control system 10 generally includes an automatic engine stop-start system (ESS) 12, a first controller or electronic control module (ECM) 14, a transmission control module (TCM) 18, and a shifter 20. The TCM 18 can additionally or alternatively include a hybrid control processor (HCP). In implementations, the TCM 18 can function as a park supervisory controller.

In the illustrated embodiment, the automatic engine stop-start system 12 generally includes a keyless ignition (KIN) 30, a radio frequency hub (RF HUB) 32, and a second controller or body control module (BCM) 34. The RF HUB 32 and the BCM 34 are in signal communication with the ECM 14 via a CAN communication bus 38. A key fob 40 may be associated with the RF HUB 32 to enable the vehicle to be started. The KIN 30 may include a start/stop button 42 in signal communication with the RF HUB 32, which is configured to send an ignition run/start signal to the BCM 34.

In general, the RF HUB 32 communicates with the BCM 34, ECM 14 and other modules to support operational vehicle features or systems. The RF HUB 32 communicates with the key fob 40 and the start/stop button 42 of the KIN 30 to determine if the driver is attempting to start the vehicle (i.e., inputs a button press indication from the start/stop button 42). The RF HUB 32 also inputs a "Park" position indication from the TCM 18. The vehicle is permitted to start only when the "Park" position indication reveals that the vehicle is in "Park".

As shown, the BCM 34 is also in signal/electrical communication with the ECM 14, and the TCM 18. In examples, the vehicle control system can further comprise a human machine interface (HMI) 36 that can receive inputs from a vehicle driver and display various messages to the driver related to the vehicle status. As used herein the HMI 36 can include any vehicle component that can at least display a message and/or indicator light including, but not limited to an instrument cluster, head up display, and infotainment system. The BCM 34 further communicates with vehicle sensors 37 to confirm status states of various components including vehicle doors, seat belts and other components.

In the example shown, a battery 40 is electrically coupled to the vehicle control system 10. In general, the battery 40 can provide power to the vehicle systems and further provide initial cranking power to a vehicle powertrain 44 including an engine 46 and transmission 48 (and/or enable propulsion in an electrified vehicle). The TCM 18 can communicate signals to the transmission 48 related to gear shift events and gear status. The transmission 48 can include a parking pawl 50 that is configured to lock the transmission 48 from shifting when the shifter 20 is in the "Park" position. In examples, the park pawl 50 communicates a signal to the TCM 18 indicative of a status thereof. The vehicle can further include an accelerator pedal (not shown) and a brake pedal 52. While not specifically shown, an auxiliary battery can be utilized in addition to battery 40 to stabilize voltage during an auto-start event of the ESS system 12. Battery 40 (and auxiliary battery) are electrically coupled to the ECM 14 via a battery feed.

In prior art configurations, the vehicle ignition "OFF" or key "OFF" management is controlled by the coordination of the BCM 34 and the RF Hub 32. The RF Hub 32 controls the KIN module 30 to maintain the ignition status to "OFF" and is based on both the shifter 20 and the transmission 48 both being in a "Park" position. Explained further, if one of the shifter 20 and the transmission 48 do not satisfy a state corresponding to the "Park" position, the ignition status remains "ON" and does not transition to "OFF". In this regard, because the prior art configurations do not let the vehicle shutdown (ignition to "OFF"), due to one of the shifter 20 or transmission 48 not in "Park", the vehicle ignition state remains in the accessory (ACC) or run condition causing the battery 40 to drain. While the configuration shown in FIG. 1 is a powertrain having a gasoline engine, the same principles are similarly adapted to other vehicle powertrains including, but not limited to, plug in hybrid vehicles (PHEV) as well.

Figures 2A, 2B, 2C, 2D:
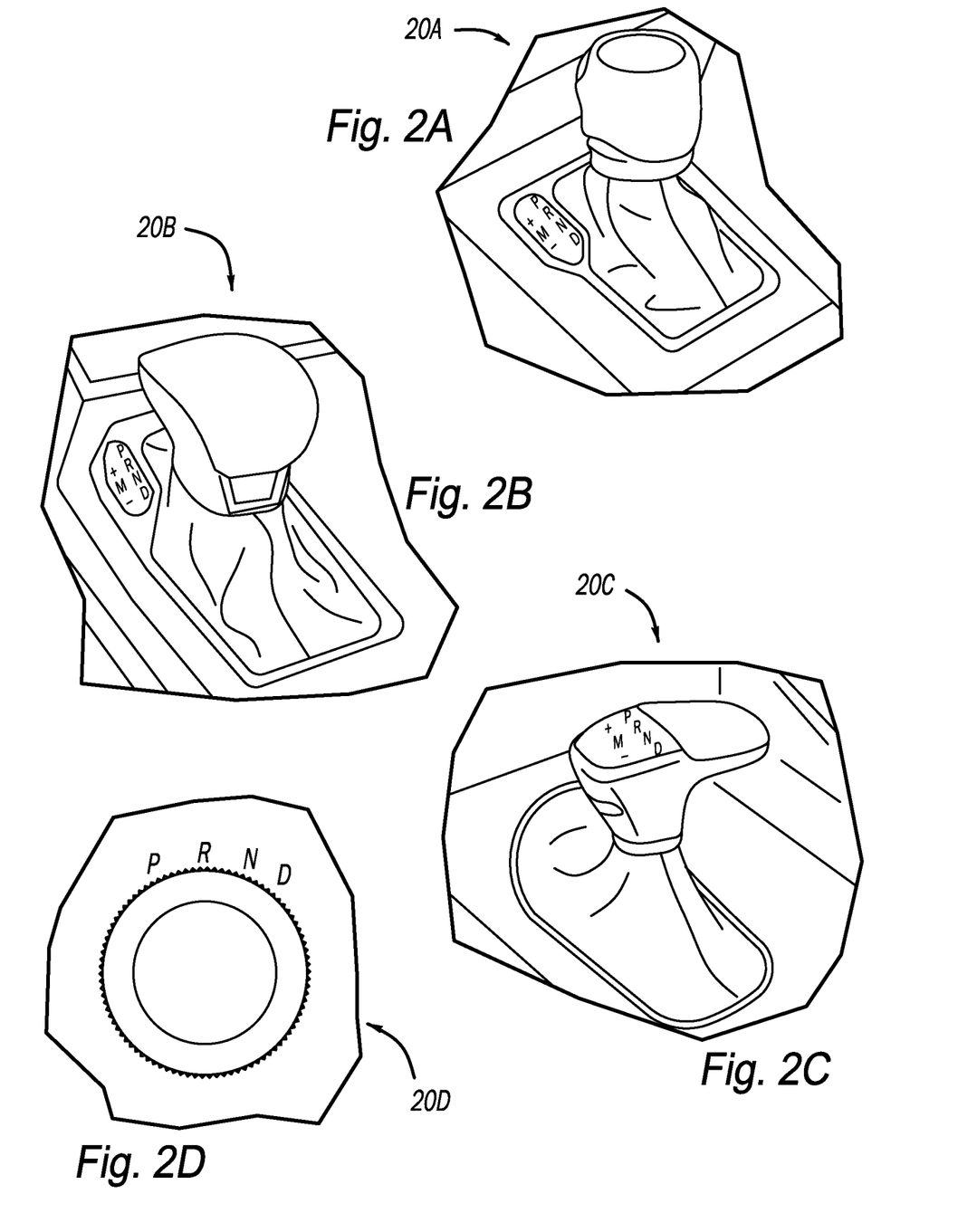
FIG. 2A-2C illustrate various poly-stable shifters according to examples of the present disclosure.
FIG. 2D illustrates a rotary style shifter according to examples of the present disclosure.

Turning now to FIGS. 2A-2C, various examples of the shifter 20 are shown and generally identified at 20A, 20B and 20C are shown. The shifters 20A-20C are poly-stable shifters. Poly-stable shifters do not have shifter auto position correction to "Park" such as when an auto-park event has occurred. In other words, the poly-stable shifters need to be physically moved to the selected gear state. If a driver does not physically move the shifter 20 to "Park", the RF Hub 32 will not allow the vehicle to power down even with the transmission 48 in "Park" as indicated by the TCM 18. A rotary style shifter 20D is shown in FIG. 2D. The present teachings are also applicable to such rotary style shifter 20D that remains in a position other than "Park" where an auto position correction to "Park" has failed, such as due to a sensor fault.

With additional reference now to FIG. 3, a table 70 showing exemplary sequences of events related to various scenarios causing battery draining according to prior art will be described. Three scenarios 100A, 100B and 100C are shown that ultimately lead to unwanted draining of the battery 40. In scenarios 100A and 100B, the driver fails to move the shifter 20 back to "Park" to power down the vehicle. In other words, the shifter 20 is in a "Non-Park" position including one of "Drive", "Reverse" and "Neutral". As discussed below, a keying "OFF" event is used to mean a driver pushing the button 42 on the KIN 12. In scenario 100C, the vehicle is in "Park", a signal between the park pawl 50 and the TCM 18 has failed causing an electrical fault which tells the system that the vehicle is not in "Park". In all of scenarios 100A-100C, the vehicle ignition state stays "ON" or in ACC/Run causing the battery 40 to drain.

Scenario 100A will now be described. In general, scenario 100A can occur during an engine auto-stop event (auto-shift to "Park") and the driver exits the vehicle without keying "OFF" the vehicle. At 110A, the engine 46 is auto-stopped with the shifter 20 in "Drive". At 112A, the brake pedal 52 is released and the ESS system 12 is ready to auto-start. At 114A, a vehicle door is opened. At 116A engine start is aborted, electronic securement system (ESS) is enabled and the TCM 18 engages the park pawl 50. At 118A, the ESS displays a message on the HMI 36 such as "Shift to Park to Exit, Shift to Drive to Restart". At 120A, the shifter 20 remains in "Drive". At 122A, the driver exits the vehicle. At 124A, the vehicle does not switch "OFF" and the ignition stays in run with the engine 46 "Off". At 130A, the battery 40 drains.

Scenario 100B will now be described. In general, scenario 100B can occur during a driver key "OFF" event where the vehicle auto-shifts to "Park" and exits the vehicle without moving the shifter 20 to "Park". At 110B, the vehicle comes to a stop with the shifter 20 in any of R/N/D. At 112B, a driver presses the KIN button 42. At 114B, the ignition status transitions from "Run" to "ACC". At 116B, the RCM 18 defaults to "Park". At 118B a message is displayed on the HMI 36 such as "Shift to Park to Start". At 120B, the shifter 20 remains at any of R/N/D. At 122B, the driver exits the vehicle. At 124B, the vehicle does not switch "Off" as the ignition stays in "ACC" with the engine 46 "Off". At 130B, the battery 40 drains. High voltage batteries on PHEV's similarly drain.

Scenario 100C will now be described. In general, scenario 100C can occur with a gated park switch (such as associated with the park pawl 50) faulted with a driver moving the shifter 20 to "Park" and the transmission 48 is also in "Park". At 110C, the shifter 20 is in "Park". At 112C, the TCM 18 engages the park pawl 50. At 114C, the TCM 18 has a short to battery or open circuit fault on the gated park switch. At 116C, the driver presses the KIN button 42 to switch "OFF". At 118C, a message is displayed on the HMI 36 such as "Service Transmission". At 120C, the shifter 20 remains in "Park". At 122C, the driver exits the vehicle. At 124C, the vehicle does not switch "OFF" as the ignition stays in "ACC" with the engine 46 "Off". At 130C, the battery 40 drains. High voltage batteries on PHEV's similarly drain.

Figure 4A:
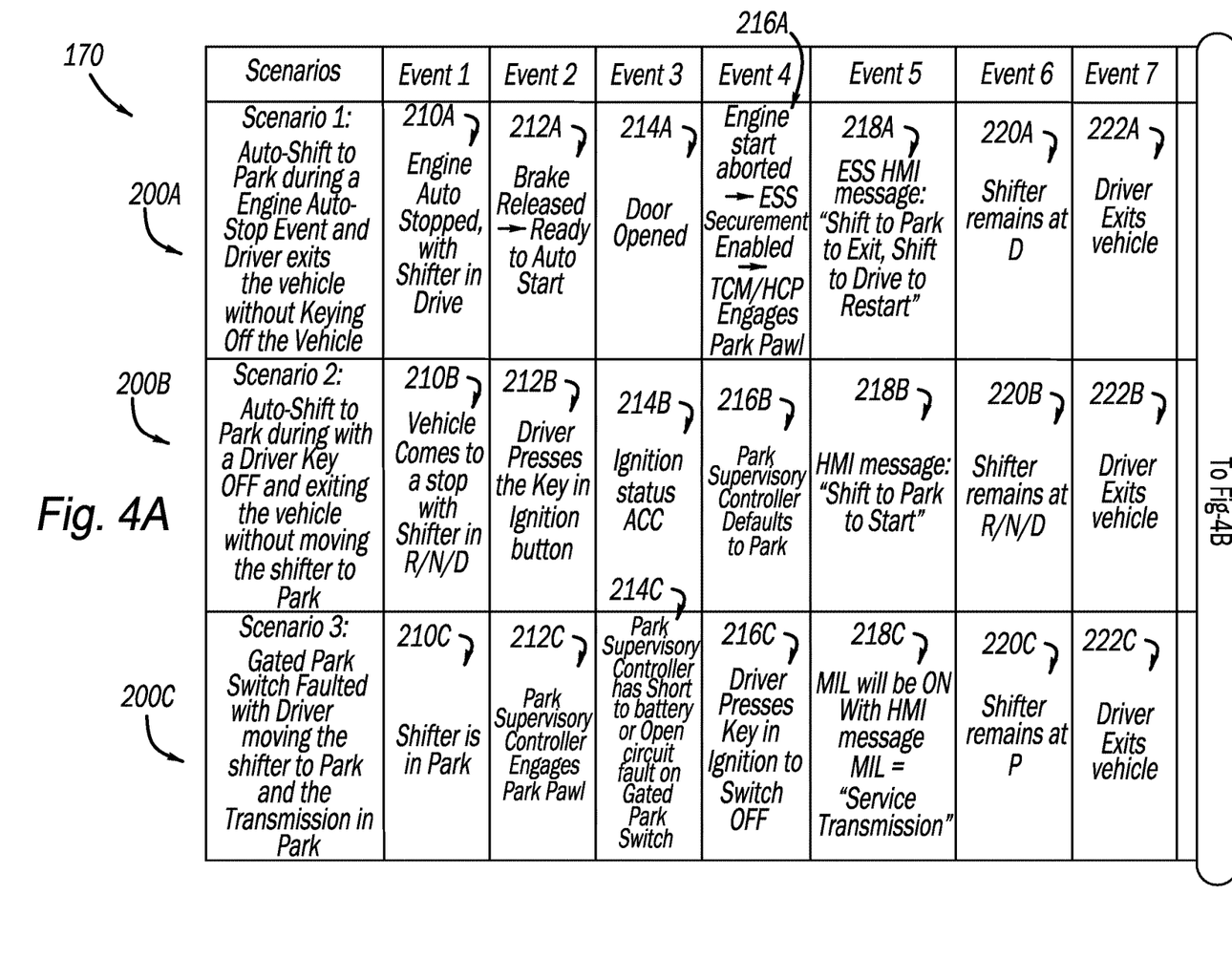
FIGS. 4A and 4B is a table showing exemplary sequences of events related to a vehicle powering down to avoid the battery draining results of FIG. 3.
Figure 4B:
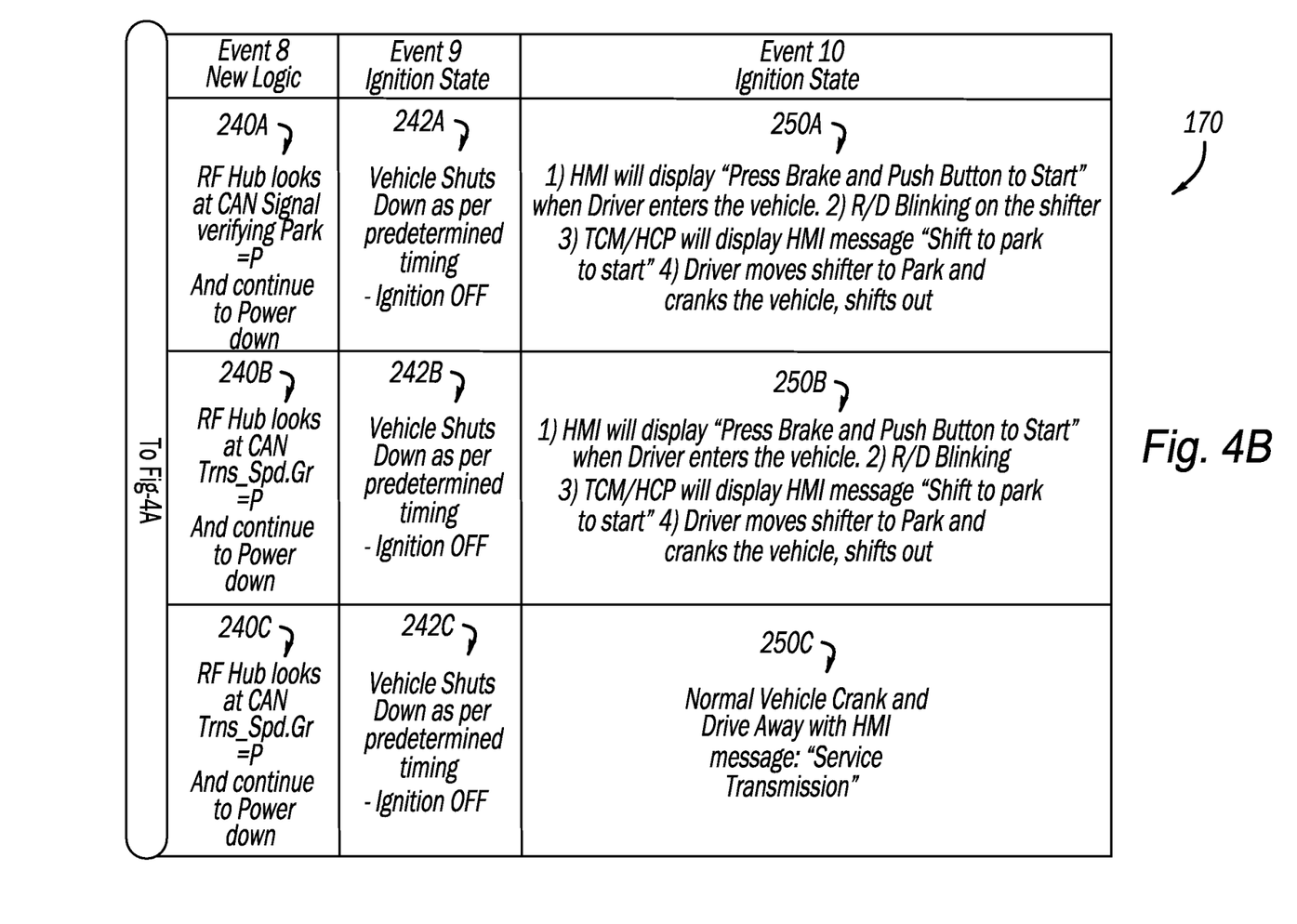

FIGS. 4A and 4B is a table 170 showing exemplary sequences of events related to a vehicle powering down to avoid the battery 40 draining results of FIG. 3. The same scenarios 100A-100C are repeated with reference numerals increased by 100 for "Events 1-7". In FIGS. 4A and 4B, "Events 8-10" are disclosed for scenarios 200A, 200B and 200C for preventing inadvertent draining of the battery 40 that would have otherwise occurred based on "Events 8-9" discussed in FIG. 3.

Referring specifically to scenario 200A, at 240A, the RF Hub 32 receives a signal from the TCM 18 indicative of the transmission in "Park". In examples, the signal can be communicated on the CAN communication bus 38. At 242A, the vehicle powers down as per predetermined timing and the ignition state is moved to "OFF". Predetermined timing is used to refer to a target elapsed time set by the BCM 34 or the ECM 14. At 250A, the HMI 36 will display a first message such as "Press Brake and Push Button to Start" when the driver enters the vehicle. In addition, the "R" or "D" can blink on the shifter 20. The HMI 36 can further display a second message "Shift to park to start". The driver can subsequently physically move the shifter 20 to "Park" where the vehicle can be successfully started due to the battery 40 not being drained.

Referring specifically to scenario 200B, at 240B, the RF Hub 32 receives a signal from the TCM 18 indicative of the transmission in "Park". In examples, the signal can be communicated on the CAN communication bus 38. At 242B, the vehicle powers down as per predetermined timing and the ignition state is moved to "OFF". Predetermined timing is used to refer to a target elapsed time set by the BCM 34 or the ECM 14. At 250B, the HMI 36 will display a first message such as "Press Brake and Push Button to Start" when the driver enters the vehicle. In addition, the "R" or "D" can blink on the shifter 20. The HMI 36 can further display a second message "Shift to park to start". The driver can subsequently physically move the shifter 20 to "Park" where the vehicle can be successfully started due to the battery 40 not being drained.

Referring specifically to scenario 200C, at 240C, the RF Hub 32 receives a signal from the TCM 18 indicative of the transmission in "Park". In examples, the signal can be communicated on the CAN communication bus 38. At 242C, the vehicle powers down as per predetermined timing and the ignition state is moved to "OFF". Predetermined timing is used to refer to a target elapsed time set by the BCM 34 or the ECM 14. At 250C, the HMI 36 will display a first message such as "Press Brake and Push Button to Start" when the driver enters the vehicle. In addition, the "R" or "D" can blink on the shifter 20. The HMI 36 can further display a second message "Shift to park to start". The driver can subsequently physically move the shifter 20 to "Park" where the vehicle can be successfully started due to the battery 40 not being drained.

Figure 5A:
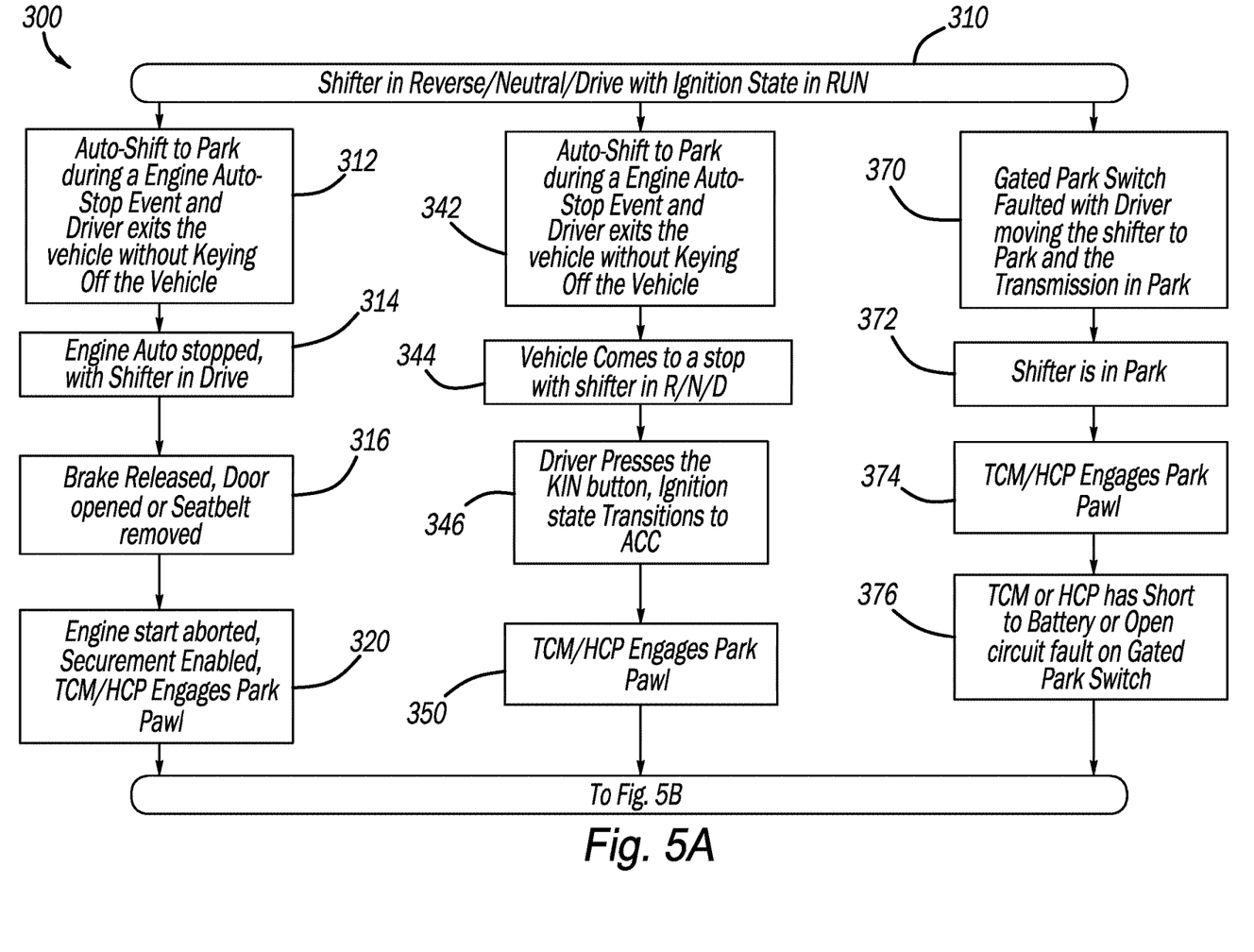
FIGS. 5A and 5B illustrate a flow diagram of an example control of the vehicle control system shown in FIG. 1, in accordance with the principles of the present disclosure.
Figure 5B:
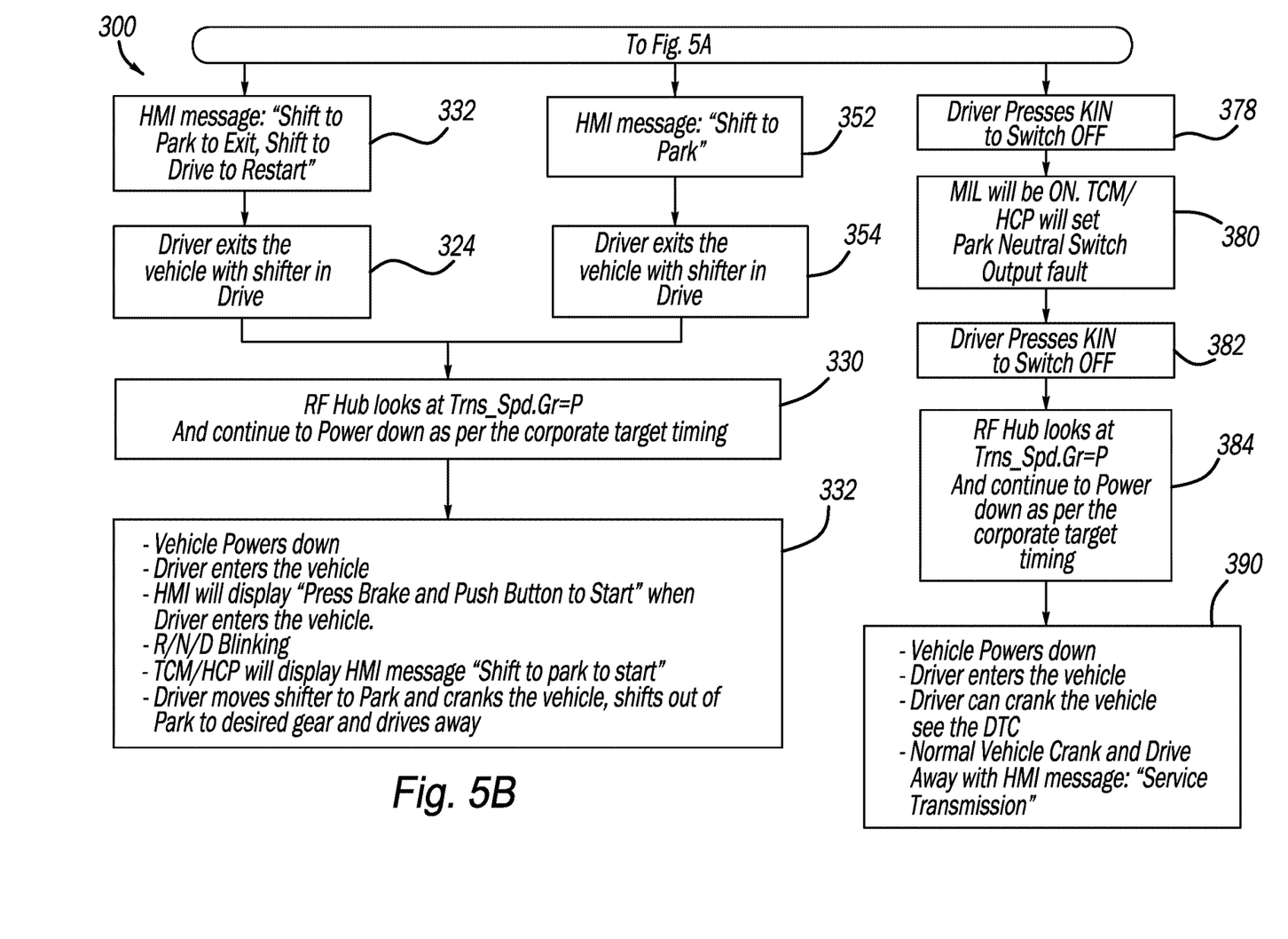

With additional reference now to FIGS. 5A and 5B an example control method 300 carried out by the vehicle control system 10 shown in FIG. 1 will be described in accordance with the principles of the present disclosure. It will be appreciated that the logic steps can correspond to the events described above related to FIGS. 4A and 4B. At 310 control determines that the shifter 20 is in one of "Reverse", "Neutral" or "Drive" with the ignition state to "RUN". At 312, control determines that the shifter 20 has auto-shift to "Park" during an engine auto-stop event and the driver exits the vehicle without keying "OFF" the vehicle. At 314 control determines that the engine 46 has auto-stopped with the shifter 20 in "Drive". At 316 control determines that the brake pedal 52 has been released or a door has been opened or a seatbelt removed. The determination is made based on signals received by sensors 37. At 320 control aborts engine start and vehicle securement strategies are enabled. The TCM 18 communicates a signal to the park pawl 50 to move to a "Park" position. At 332, control sends a signal to the HMI 36 to display a message informing the driver that the poly-shifter 20 was not properly returned to "Park". By way of example only, such message can include "Shift to Park to Exit, Shift to Drive to Restart". At 324, control determines that the driver has exited the vehicle with the shifter 20 in a position other than park such as "Drive". At 330, the RF Hub 32 receives a signal from the TCM 18 indicative of the transmission in "Park". Control powers down the vehicle in response to the signal from the TCM 18. At 332, control determines that the vehicle has powered down. Control subsequently determines that the driver has entered the vehicle and sends a signal to the HMI 36 to display a message such as "Press Brake and Push Button to Start". Control can determine that a driver has entered the vehicle based on at least one of a door being opened and a seat belt being latched (based on signals from sensors 37). Control can concurrently send a signal to the shifter 20 to blink "R/N/D". The TCM 18 can send a signal to the HMI 36 to display a message "Shift to park to start". The driver can physically move the shifter 20 to "Park" and successfully start the engine 46 (due to the battery 40 not being inadvertently drained).

In a second control scenario, at 342, control determines that the shifter 20 has auto-shift to "Park" during an engine auto-stop event and the driver exits the vehicle without keying "OFF" the vehicle. At 344, control determines that the vehicle has come to a stop with the shifter 20 in any of "R/N/D". At 346, control determines that the driver has pressed the KIN button 42 and the ignition transitions to "ACC". At 350 control communicates a signal to engage the park pawl 50. In examples, the TCM 18 can communicate the signal to the park pawl 50. At 352, control communicates a signal to the HMI 36 to display a message "Shift to Park". At 354, control determines that the driver has exited the vehicle with the shifter 20 in "Drive". Control then proceeds to 330 and 332.

In a third control scenario, at 370, a gated park switch associated with the park pawl 50 is faulted with the driver moving the shifter 20 to "Park" and the transmission 48 is also in "Park". At 372 control determines that the shifter 20 is in "Park". At 374, control communicates a signal to engage the park pawl 50. In examples, the TCM 18 can communicate the signal to the park pawl 50. At 376, control determines there is a fault or short. In examples, control can determined that the TCM 18 has a short to the battery 40. In other examples, the TCM can determine that the gated park switch has an open circuit fault. At 378 control determines that the driver presses the KIN button 42 to "OFF". At 380 control determines that the TCM 18 has set a park switch output fault. At 382 control determines that the driver presses the KIN button 42 to "OFF". At 384, the RF Hub 32 receives a signal from the TCM 18 indicative of the transmission 48 in "Park". Control powers down the vehicle in response to the signal from the TCM 18. At 390, control determines that the vehicle has powered down. Control subsequently determines that the driver has entered the vehicle. The driver can then successfully start the engine 46 (due to the battery 40 not being inadvertently drained). Control sends a message to the HMI indicative of the fault. In examples, the message can include "Service Transmission".

It will be appreciated that the term "controller" as used herein refers to any suitable control device(s) that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture. It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a vehicle having an electronic shifter for a transmission, the control system comprising:
    a poly-shifter, the poly-shifter configured to be moved between operating states including "Park" and "Non-Park" positions;
    a radio frequency hub (RF Hub) that supports operational features of the vehicle;
    a transmission control module (TCM) that determines a lock state of a parking pawl in the transmission and communicates the lock state to the RF Hub; and
    a controller configured to:
    determine whether a driver has exited the vehicle with the poly-shifter in a "Non-Park" position; and
    power down the vehicle based on the lock state of the parking pawl being in a "Park" position and the determination that the driver has exited the vehicle with the poly-shifter in the "Non-Park" position.

2. The control system of claim 1, wherein the controller is further configured to:
    determine that the vehicle is in an engine auto-stop event and wherein the power down is further based on the vehicle in the engine auto-stop event.

3. The control system of claim 2, wherein the controller is further configured to:
    determine that the vehicle has not been keyed "OFF" and wherein the power down is further based on the vehicle not being keyed "OFF".

4. The control system of claim 3, wherein determining that the vehicle has not been keyed "OFF" comprises determining that an ignition status is "ON".

5. The control system of claim 1, wherein the "Non-Park" position comprises "Drive".

6. The control system of claim 5, wherein the controller determines that the driver has exited the vehicle based on a signal received by the controller indicative of at least one of a brake pedal being released, a vehicle door being opened or a seat belt removed.

7. The control system of claim 1, wherein the controller is further configured to:
subsequent to power down, determine a driver has entered the vehicle; and
send a signal to a human machine interface (HMI) to communicate a message informing the driver that the poly-shifter was not properly returned to "Park".

8. The control system of claim 1, wherein the controller communicates a signal to change the lock state of the parking pawl to the "Park" position based on the driver exiting the vehicle with the poly-shifter in the "Non-Park" position.

9. The control system of claim 1, wherein the "Non-Park" position comprises one of "Drive", "Reverse" and "Neutral".

10. The control system of claim 9, wherein the controller is further configured to:
determine an ignition state to be in accessory ("ACC") and wherein the controller communicates a signal to change the lock state of the parking pawl to the "Park" position based on the poly-shifter being in the "Non-Park" position and the ignition state being in the ACC state.

11. A method for powering off a vehicle having a poly-shifter, the poly-shifter configured to be moved between operating states including "Park" and "Non-Park" positions, the method comprising:
determining a lock state of a parking pawl in a transmission of the vehicle;
communicating the lock state to a radio frequency hub (RF Hub);
determining whether a driver has exited the vehicle with the poly-shifter in a "Non-Park" position; and
powering down the vehicle based on the lock state of the parking pawl being in a "Park" position and the driver exiting the vehicle with the poly-shifter in the "Non-Park" position.

12. The method of claim 11, further comprising:
determining that the vehicle is in an engine auto-stop event and wherein the powering down is further based on the vehicle in the engine auto-stop event.

13. The method of claim 12, further comprising:
determining that the vehicle has been keyed "OFF" and wherein the powering down is further based on the vehicle not being keyed "OFF".

14. The method of claim 11, further comprising:
determining that a driver has exited the vehicle based on at least one of a brake pedal being released, a vehicle door being opened or a seat belt being removed.

15. The method of claim 14, further comprising:
subsequent to the powering down, determining whether a driver has entered the vehicle; and
communicating a signal to a human machine interface (HMI) indicative of a message informing the driver that the poly-shifter was not properly returned to "Park".

16. The method of claim 11, further comprising:
communicating a signal to change the lock state of the parking pawl to the "Park" position based on the determination that a driver has exited the vehicle with the poly-shifter in the "Non-Park" position.

17. The method of claim 11, further comprising:
determining an ignition state to be in accessory ("ACC"); and
communicating a signal to change the lock state of the parking pawl to the "Park" position based on the poly-shifter being in the "Non-Park" position and the ignition being in the "ACC" state.

18. A method of powering off a vehicle having a poly-shifter, the poly-shifter configured to be moved between operating states including "Park" and "Non-Park" positions, the method comprising:
determining a lock state of a parking pawl in a transmission of the vehicle;
communicating the lock state to a radio frequency hub (RF Hub);
determining whether a driver has exited the vehicle with the poly-shifter in a "Park" position;
determining a circuit fault based on one of the poly-shifter and the lock state of the parking pawl; and
powering down the vehicle based on the lock state of the parking pawl being in a "Park" position and the driver exiting the vehicle with the poly-shifter in the "Park" position.

19. The method of claim 18, further comprising:
subsequent to the powering down, determining whether a driver has entered the vehicle; and
communicating a signal to a human machine interface (HMI) indicative of a message informing the driver to service the transmission.

* * * * *